United States Patent
Kuntz et al.

(10) Patent No.: US 6,860,927 B2
(45) Date of Patent: Mar. 1, 2005

(54) POLYMER BEADS

(75) Inventors: Matthias Kuntz, Seeheim (DE); David Coates, Dorset (GB); Simon Greenfield, Dorset (GB); John Patrick, Dorset (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/678,272

(22) Filed: Oct. 6, 2003

(65) Prior Publication Data

US 2004/0067210 A1 Apr. 8, 2004

Related U.S. Application Data

(62) Division of application No. 09/954,013, filed on Sep. 18, 2001, now Pat. No. 6,677,042.

(30) Foreign Application Priority Data

Sep. 19, 2000 (EP) .............................. 00120111

(51) Int. Cl.$^7$ ............................ C09D 11/00; B32B 7/02; G03C 8/00

(52) U.S. Cl. ............................... 106/31.13; 106/31.04; 106/31.16; 106/31.27; 428/221; 428/916; 430/321

(58) Field of Search .......................... 106/31.04, 31.13, 106/31.16, 31.27; 428/221, 916; 430/321

(56) References Cited

FOREIGN PATENT DOCUMENTS

WO      WO 98/00428    *   1/1998

* cited by examiner

Primary Examiner—Samuel A. Acquah
(74) Attorney, Agent, or Firm—Millen, White, Zelano & Branigan, P.C.

(57) ABSTRACT

The invention relates to polymer beads comprising an anisotropic polymer material with helically twisted structure, to their use in reflective films, spraying or printing inks or as pigments, for optical or electrooptical, decorative or security applications, to a reflective film comprising one or more polymer beads in a transmissive binder, and to a security marking or security device comprising one or more polymer beads or comprising a reflective film.

5 Claims, No Drawings

POLYMER BEADS

This application is a Division of Ser. No. 09/954,013 filed Sep. 18, 2001, now U.S. Pat. No. 6,677,042.

FIELD OF THE INVENTION

The invention relates to polymer beads comprising an anisotropic polymer material with helically twisted structure, to methods of their preparation, to their use in reflective films, spraying or printing inks or as pigments, for optical or electrooptical, decorative or security applications, to a reflective film comprising one or more polymer beads in a transmissive binder, and to a security marking or security device comprising one or more polymer beads or comprising a reflective film.

BACKGROUND AND PRIOR ART

In prior art encapsulated cholesteric liquid crystals (CLCs) are known for use in decorative or security applications, like for example printing inks, colored images, identification cards, bank notes or other documents of value that should be forge-proof. The CLC material is usually a mixture of low molecular weight CLC compounds that is encapsulated or encased in a transparent shell of e.g. gum arabic or gelatine. Often photochromic or thermochromic CLC mixtures are used which change their color or become colorless when being subjected to photoradiation or to a temperature change, respectively.

CLCs are characterized by a helically twisted structure. A layer of a CLC material with planar alignment, i.e. wherein the cholesteric helix axis is oriented perpendicular to the plane of the layer, shows selective reflection of circular polarized light caused by interaction of incident light with the cholesteric helix. The central wavelength of reflection $\lambda$ depends on the pitch p and the average refractive index n of the CLC material according to the following equation $$\lambda = n \cdot p$$

However, encapsulated CLCs have several disadvantages. For example, the capsules containing the CLCs exhibit only limited long term stability, and can break and release the CLCs. Furthermore, they are sensitive to heat and pressure. Therefore, whereas encapsulated CLCs may be useful for short term applications such as clothing labels etc., they are less suitable for long term security items such as bank notes.

The inventors have found that the above mentioned drawbacks can be avoided by using solid polymer beads comprising a polymerized anisotropic material with helically twisted structure, like for example polymer beads of polymerized liquid crystal material, instead of a low molecular weight LC mixture encapsulated in a polymer shell. Solid LC polymer beads according to the present invention have better chemical and heat resistance and are therefore more suitable for both short and long term applications than encapsulated LCs.

JP 02-281045 discloses liquid crystalline high polymer spherical particles of a thermotropic polymer, like e.g. a polyester, which can be used as particulated moulding material, sinter-molding material, filler for thermoplastic and thermosetting plastic material and filler of heat-resistant paint, enamel and additives. However, JP 02-281045 does not disclose LC polymer beads with a helically twisted structure.

Definition of Terms

In connection with polymer beads and reflective films as described in the present application, the following definitions of terms as used throughout this application are given.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behavior. Rod-shaped and lath-shaped mesogenic groups are especially preferred. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'helically twisted structure' refers to anisotropic materials, like for example liquid crystal materials, that exhibit a chiral mesophase wherein the mesogens are oriented with their main molecular axis twisted around a helix axis, like e.g. a chiral nematic (=cholesteric) or a chiral smectic phase. Materials exhibiting a cholesteric phase or chiral smectic C phase are preferred. Particularly preferred are materials exhibiting a cholesteric phase.

The term 'film' includes self-supporting, i.e. free-standing, films that show more or less pronounced mechanical stability and flexibility, as well as coatings or layers on a supporting substrate or between two substrates.

The term 'beads' includes, besides others and preferably spherical particles, rotational elliptic particles, egg shaped particles, e.g. particles which are rotationally symmetric to one axis, droplet shaped particles, pellets, but also less symmetrical particles like spheres with protrusions. Particles with cylinder symmetry and more or less spherical particles are especially preferred.

It was found that the molecular helices in the inventive polymer beads do not have to be perfectly ordered, but sufficiently ordered so that the beads show a significant degree of selectivity in reflection of light. In the foregoing and the following, this type of partial, incomplete or adequate orientation of the molecular helices in the inventive polymer beads is referred to as "partial ordering" or "partially ordered".

SUMMARY OF THE INVENTION

One object of the present invention is polymer beads comprising an anisotropic polymer material with helically twisted structure.

Another object of the invention is a method of preparing polymer beads according to the present invention.

Another object of the invention is the use of polymer beads according to the present invention in reflective films, spraying or printing inks or as pigments, for optical or electrooptical, decorative or security applications.

Another object of the invention is a reflective film comprising one or more polymer beads according to the present invention in a transmissive binder.

Another object of the invention is a security marking or security device comprising one or more polymer beads or comprising a reflective film according to the present invention.

Upon further study of the specification and appended claims, further objects and advantages of this invention will become apparent to those skilled in the art.

DETAILED DESCRIPTION OF THE INVENTION

Preferred embodiments of the invention are directed to polymer beads with an average diameter from 0.5 to 100 μm, preferably from 1 to 20 μm, very preferably from 4 to 10 μm, polymer beads wherein the anisotropic polymer material is a linear or crosslinked cholesteric side chain polymer, polymer beads wherein the anisotropic polymer material forms a three-dimensional network, polymer beads exhibiting selective reflection of circularly polarized light, with the central wavelength of reflection being in the range from 200 nm to 1000 nm, polymer beads wherein the central wavelength of reflection is in the UV range, preferably from 200 nm to 380 nm, polymer beads wherein the central wavelength of reflection is in the visible range, preferably from 380 nm to 720 nm, polymer beads wherein the central wavelength of reflection is in the IR range, preferably from 720 nm to 1000 nm, polymer beads wherein the reflected wavelength is substantially independent of the viewing angle, polymer beads reflecting circularly polarized light of a single handedness, i.e. either right-handed or left-handed circularly polarized light, polymer beads wherein the molecular helices in the liquid crystal polymer material exhibit partial ordering, polymer beads obtainable by emulsion, suspension or dispersion polymerization of droplets comprising a polymerizable chiral liquid crystal material.

a reflective film comprising at least two different polymer beads, a reflective film wherein said at least two different polymer beads reflect circularly polarized light of different handedness.

The inventive polymer beads preferably have a particle size of 1 to 20 μm, in particular from 4 to 10 μm. Small particles lead to light scattering and thus dilute the color intensity, whereas large particles will give poor cover allowing the background to show through.

The inventive polymer beads are particularly suitable for use in films or coatings as false-proof security marking e.g. on documents of value, like bank notes, cheques, ID cards, passports, or other security devices, when a viewing angle dependent color effect is not desired.

Thus, a preferred embodiment of the present invention relates to a reflective film or coating comprising inventive polymer beads dispersed in an optically isotropic light transmissive binder.

For example, inventive polymer beads reflecting either right-handed or left-handed circularly polarized light can be dispersed into a light transmissive binder and coated onto a substrate, e.g. a document or security device that is preferably covered with a black layer. The black layer, however, is not necessarily required. When observed under unpolarized light, the layer of coated beads will have a colored appearance. When observed under left-handed or right-handed circularly polarized light, the beads will appear bright under one handedness and dark under the other handedness. Thereby, authentification of the document or identification of a hidden pattern, formed by regions with different handedness, can be achieved.

Polymer beads reflecting either left-handed or right-handed circularly polarized light can be prepared for example by using a polymerizable CLC starting material with enantiomerically pure chiral compounds.

Furthermore, a reflective film or coating comprising the inventive polymer beads can be covered with a quarter wave retardation film or layer (QWF). The light reflected from the film or coating and passing the QWF will then be linearly polarized. Thus, when using such a film or coating as security marking, authentification can be achieved by observation under linearly polarized light.

For example, if a layer of inventive polymer beads with a given reflection color is coated on a black substrate, covered with a QWF and viewed through a rotating linear polarizer, it would show the reflection color in a first polarization direction and appear black in a polarization direction perpendicular to the first direction.

For some applications, it is preferable to use mixtures of inventive polymer beads with different reflection maxima. A multicolored image may be created by coating each mixture separately, for example by printing discrete areas on the same substrate.

A preferred embodiment of the present invention relates to a reflective film or coating comprising at least two different inventive polymer beads that reflect circularly polarized light of substantially the same waveband but of opposite handednesses.

When using such a mixture of inventive polymer beads in a reflective film or coating, a pattern or image can be created that is invisible when observed under unpolarized light, but visible when observed under circularly polarized light, or, if covered with a QWF, when observed under linear polarized light.

The inventive polymer beads are preferably prepared from a polymerizable chiral liquid crystal material, in particular from a polymerizable cholesteric liquid crystal (CLC) material.

The polymer beads can be prepared by known methods, for example by solution polymerization, emulsion polymerization, suspension or dispersion polymerization. Details on suitable polymerization methods and preferred reaction conditions can be taken from Polymer Synthesis Vol. 1, 2nd edition, 1992, by S. R. Sandier and W. Karo.

To induce a chiral LC phase in the polymerizable material, for example, a mixture comprising an achiral and a chiral mesogenic polymerizable compound can be used. To induce cholesteric phase behavior, for example, a chiral nematic and an achiral nematic polymerizable compound are used. The chiral nematic compound induces the helically twisted cholesteric phase structure.

As the pitch of the cholesteric helix is dependent on the chemical constitution and the concentration of the chiral compound, the wavelength of the reflection maximum and therewith the color properties of the polymer beads can be controlled directly in the production process just by varying the type and the ratio of the chiral mesogenic compound. Thus polymer beads with the desired colors can be tailored.

The ability of a chiral compound to induce a cholesteric structure with a certain helical pitch in a nematic host material is called its helical twisting power (HTP). If a compound with a high HTP is used, only a small amount is sufficient to achieve a cholesteric structure with reflection of visible light. In this case it is not necessary that the chiral compound exhibits a liquid crystal phase per se. It is sufficient that the mixture of the chiral and achiral compounds shows a liquid crystal phase.

In a preferred embodiment the polymerizable CLC mixture comprises at least one polymerizable mesogenic compound having two or more polymerizable functional groups (di- or multireactive or di- or multifunctional compound). Upon polymerization of such a mixture a three-dimensional polymer network is formed. Polymer beads made of such a network show a high mechanical and thermal stability and a low temperature dependence of the liquid crystal properties. In the ideal case the liquid crystal properties of the polymer beads are temperature independent.

By varying the concentration of the multifunctional mesogenic or non mesogenic compounds, the crosslink density of the resulting polymer beads and thereby the physical and chemical properties such as the glass transition temperature, which is also important for the temperature dependence of the optical properties, the thermal and mechanical stability or the solvent resistance can be tuned easily.

According to the desired application e.g. beads of a higher brittleness can be made by increasing the amount of multifunctional component. A high brittleness can also be achieved by using compounds with more than two polymerizable groups which may be mesogenic or non mesogenic. Typical examples for non mesogenic monomers with more than two polymerizable groups are trimethylolpropane-trimethacrylate or pentaerythritoltetraacrylate.

In a preferred embodiment of the present invention, the polymerizable CLC material comprises at least one polymerizable mesogenic compound having one polymerizable functional group and at least one polymerizable mesogenic compound having two or more polymerizable functional groups.

In another preferred embodiment of the present invention the polymerizable CLC material comprises at least one chiral polymerizable mesogenic compound and at least one achiral polymerizable mesogenic compound.

In another preferred embodiment the polymerizable CLC material comprises at least one achiral polymerizable mesogenic compound and a non-polymerizable chiral dopant. The material according to this preferred embodiment may further comprise one or more chiral polymerizable compounds.

Since the polymerizable mixture may contain both polymerizable components with one (monofunctional) and with two or more polymerizable groups (multifunctional), polymerization and crosslinking are carried out in the same process.

Preferably the polymerizable CLC mixture comprises 5 to 100%, in particular 25 to 95%, most preferably 45 to 85%, by weight of multireactive mesogenic compounds. Direactive mesogenic compounds are particularly preferred.

The polymerizable components of the CLC material according to the present invention are preferably selected from compounds of the formula I P-(Sp-X)$_n$-MG-R      I wherein P is CH$_2$=CW—COO—, WCH=CH—O—,

or CH$_2$=CH— Phenyl-(O)$_k$— with W being H, CH$_3$ or Cl and k being 0 or 1,

Sp is a spacer group having 1 to 25 C atoms,

X is —O—, —S—, —CO—, —COO—, —OCO—, —CO—NH—, —NH—CO—, —CH$_2$CH$_2$—, —OCH$_2$—, —CH$_2$O—, —SCH$_2$—, —CH$_2$S—, —CH=CH—, —CH=CH—COO—, —OCO—CH=CH—, —C≡C—, or a single bond, n is 0 or 1, MG is a mesogenic group, and R is H, CN, OCN, SCN, SF$_5$, F, Cl or a straight-chain or branched alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S—, —CH=CH— or —C≡C— in such a manner that oxygen atoms are not linked directly to one another, or alternatively R is denoting P-(Sp-X)$_n$—.

In a preferred embodiment of the present invention MG is of formula II

-A$^1$-(Z-A$^2$)$_m$-      II wherein

Z is in each case independently —O—, —S—, —CO—, —COO—, —OCO—, —O—COO—, —CO—N(R$^3$)—, —N(R$^3$)—CO—, —OCH$_2$—, —CH$_2$O—, —SCH$_2$—, —CH$_2$S—, —CH$_2$CH$_2$—, —CH=CH—, —C≡C—, —CH=N—, —CH=CH—COO—, —OCO—CH=CH— or a single bond, A$^1$ and A$^2$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydronaphthalene-2,6-diyl, it being possible for all these groups to be unsubstituted, mono- or polysubstituted with F, Cl, OH, CN or NO$_2$ or alkyl, alkoxy, alkylcarbonyl or alkoxycarbonyl groups having 1 to 7 C atoms wherein one or more H atoms may be substituted by F or Cl, and m is 0, 1, 2 or 3.

Preferred are compounds wherein the mesogenic group A$^1$-(Z-A$^2$)$_m$ incorporates two or three five- or six-membered rings.

Another preferred embodiment relates to compounds wherein at least one radical Z denotes —C≡C—. These compounds are especially suitable for uses where highly birefringent materials are needed.

A smaller group of preferred mesogenic groups of formula II is listed below. For reasons of simplicity, Phe in these groups is 1,4-phenylene, PheL is a 1,4-phenylene group which is substituted by 1 to 4 groups L, with L being F, Cl, OH, CN, NO$_2$ or an optionally fluorinated alkyl, alkoxy, alkylcarbonyl or alkoxycarbonyl group with 1 to 7 C atoms, and Cyc is 1,4-cyclohexylene. Z has one of the meanings of formula II. The list is comprising the following subformulae as well as their mirror images

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |

-Phe-Z-Cyc-Z-Cyc-    II-11
-Cyc-Z-Cyc-Z-Cyc-    II-12
-Phe-Z-Phe-Z-PheL-    II-13
-Phe-Z-PheL-Z-Phe-    II-14
-PheL-Z-Phe-Z-Phe-    II-15
-PheL-Z-Phe-Z-PheL-    II-16
-PheL-Z-PheL-Z-Phe-    II-17
-PheL-Z-PheL-Z-PheL-    II-18
-Phe-Z-PheL-Z-Cyc-    II-19
-Phe-Z-Cyc-Z-PheL-    II-20
-Cyc-Z-Phe-Z-PheL-    II-21
-PheL-Z-Cyc-Z-PheL-    II-22
-PheL-Z-PheL-Z-Cyc-    II-23
-PheL-Z-Cyc-Z-Cyc-    II-24
-Cyc-Z-PheL-Z-Cyc-    II-25

Preferred are the subformulae II-1, II-2, II-4, II-6, II-7, II-8, II-11, II-13, II-14, II-15 and II-16.

Preferably Z is —COO—, —OCO—, —CH$_2$CH$_2$—, —C≡C— or a single bond.

Preferably the mesogenic group MG is selected from the following formulae and their mirror images

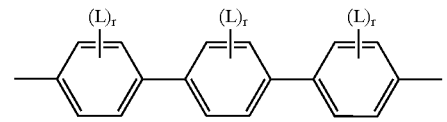
IIa

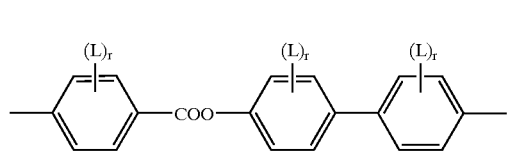
IIb

IIc

IId

IIe

IIf

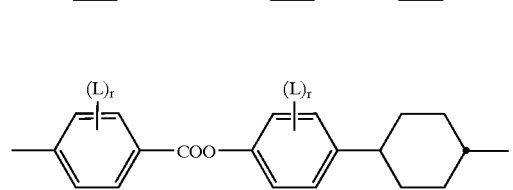
IIg

IIh

IIi

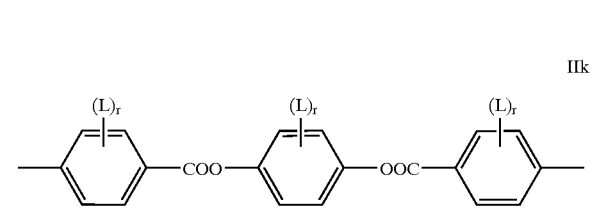
IIk

IIm

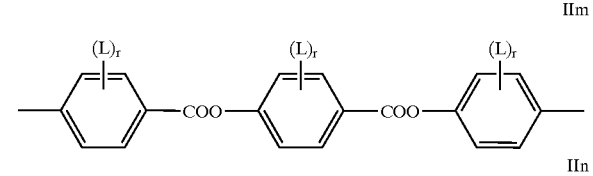
IIn

IIo

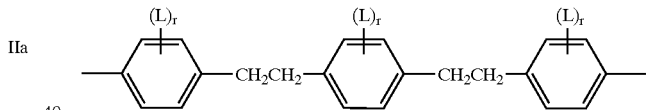

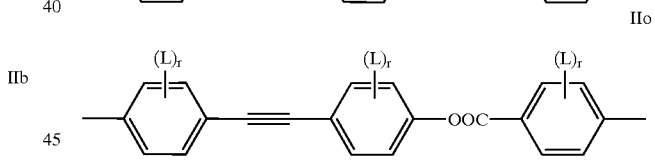

wherein L has the meaning given above and r is 0, 1 or 2.

The group

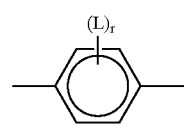

in these preferred formulae is very preferably denoting

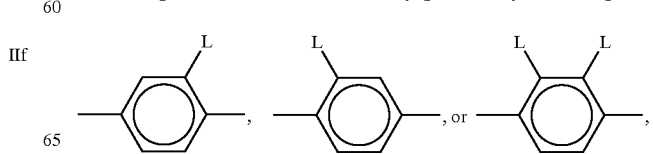

furthermore

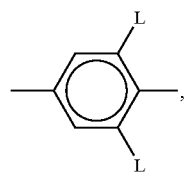

with L having each independently one of the meanings given above.

Preferred are the subformulae IId, IIg, IIh, IIi, IIk and IIo, in particular the subformulae IId and IIk.

L is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$, CF$_3$ and OCF$_3$, most preferably F, Cl, CH$_3$, OCH$_3$ and OCF$_3$.

In another preferred embodiment of the present invention the polymerizable mixture comprises at least one chiral polymerizable compound of formula I comprising a mesogenic group having at least one center of chirality.

In these compounds MG is preferably selected according to the following formulae

wherein

A$^1$, A$^2$ and Z$^1$ have the meaning given in formula II, a and b are independently of each other 0, 1 or 2, G$^1$ together with R in formula I forms a terminal chiral group, and G$^2$ is a bivalent chiral group.

Preferred chiral groups G$^1$-R are for example cholesteryl, terpenoid radicals as disclosed e.g. in WO 96/17901, preferably selected from menthyl, neomenthyl, borneyl, campheyl, isopino-campheyl, pineyl, terpineyl, isolongifolyl, fenchyl, carveyl, myrthenyl, nopyl, geraniyl, linaloyl, neryl, citronellyl and dihydrocitronellyl, very preferably menthyl, groups selected from menthone derivatives like

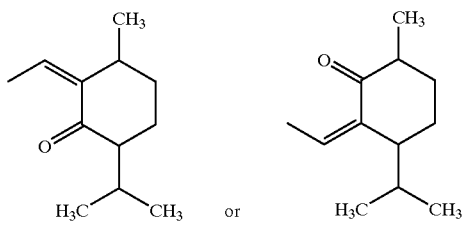

or terminal chiral sugar derivatives comprising a mono- or dicyclic radical with pyranose or furanose rings like, for example, a terminal group derived from the chiral sugars disclosed in WO 95/16007.

Preferred chiral groups are for example groups derived from sugars, binaphthyl derivatives, or optically active glycols, especially ethane-1,2-diol substituted in 1- and or 2-position with alkyl or aryl groups. In case of sugar groups, these are preferably selected from mono- and dicyclic groups comprising pentose or hexose rings.

Preferred are the following groups G$^2$

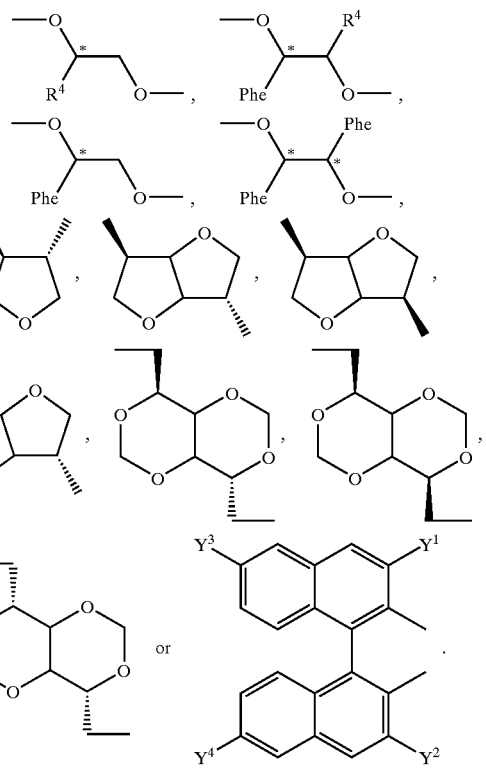

wherein Phe has the meaning given above, R$^4$ is F or optionally fluorinated alkyl with 1 to 4 C atoms and Y$^1$, Y$^2$, Y$^3$ and Y$^4$ have one of the meanings of R$^1$ in formula I.

Preferably G$^2$ is dianhydrohexitol like

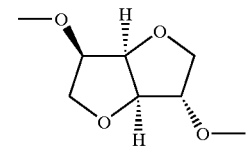

dianhydrosorbitol

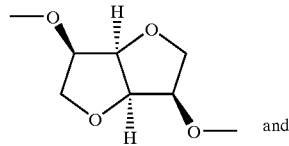

and dianhydromannitol

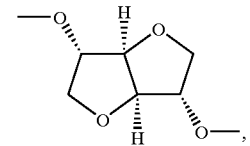

dianhydroiditol preferably dianhydrosorbitol, substituted ethane diol like

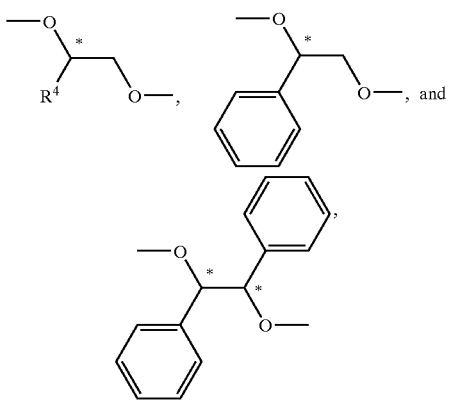

wherein R⁴ is F, CH₃ or CF₃,
or optionally substituted binaphthyl

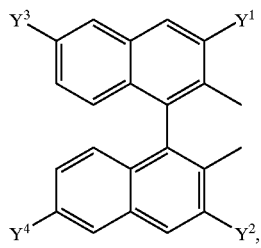

wherein $Y^1$, $Y^2$, $Y^3$ and $Y^4$ are H, F or optionally fluorinated alkyl with 1 to 8 C atoms.

In case $G^2$ is dianhydro-D-sorbitol as disclosed above, preferably a and b in formula II2* are 1 or 2 and/or $Z^1$ in formula II2* is denoting —CH=CH— and/or R in formula I is different from P-(Sp-X)$_n$— and/or -(A¹-Z¹)$_a$- and -(Z¹-A²)$_b$- in formula II2* are different.

Preferably -(A¹-Z¹)$_a$- and -(Z¹-A²)$_b$- in formula II1* and II2* are selected of the above disclosed preferred formulae II-1 to II-25 and IIa to IIo, most preferably of formulae II1 to II6 and IIa to IIf.

If R in formula I is an alkyl or alkoxy radical, i.e. where the terminal CH₂ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Preferably R is straight chain alkyl or alkoxy with 1 to 8 C atoms.

Oxaalkyl, i.e. where one CH₂ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

Halogen is preferably F or Cl.

R in formula I can be a polar or an unpolar group. In case of a polar group, R is selected from CN, NO₂, halogen, OCH₃, OCN, SCN, COR⁵, COOR⁵ or a mono- oligo- or polyfluorinated alkyl or alkoxy group with 1 to 4 C atoms. R⁵ is optionally fluorinated alkyl with 1 to 4, preferably 1 to 3 C atoms. Especially preferably polar groups R are selected of F, Cl, CN, NO₂, OCH₃, COCH₃, COC₂H₅, COOCH₃, COOC₂H₅, CF₃, C₂F₅, OCF₃, OCHF₂, and OC₂F₅, in particular of F, Cl, CN, OCH₃ and OCF₃.

In case of an unpolar group, R is preferably alkyl with up to 15 C atoms or alkoxy with 2 to 15 C atoms.

R in formula I can be an achiral or a chiral group. In case of a chiral group it is preferably selected according to the following formula III:

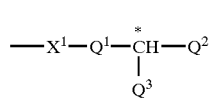

wherein
$X^1$ is —O—, —S—, —CO—, —COO—, —OCO—, —OCOO— or a single bond,
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted by halogen or CN, it being also possible for one or more non-adjacent CH₂ groups to be replaced, in each case independently from one another, by —C≡C—, —O—, —S—, —NH—, —N(CH₃)—, —CO—, —COO—, —OCO—, —OCO—O—, —S—CO— or —CO—S— in such a manner that oxygen atoms are not linked directly to one another,
$Q^3$ is halogen, a cyano group or an alkyl or alkoxy group with 1 to 4 C atoms different from $Q^2$.

In case $Q^1$ in formula III is an alkylene-oxy group, the O atom is preferably adjacent to the chiral C atom.

Preferred chiral groups R are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Further preferred chiral groups R are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy, for example.

In addition, compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Another preferred embodiment of the present invention relates to compounds of formula I wherein R is denoting P-(Sp-X)$_n$—.

P in formula I is preferably an acrylate group, a methacrylate group, a vinyl or vinyloxy group, an epoxy group, a styrene group or a propenyl ether group, in particular an acrylate, methacrylate, vinyl or epoxy group.

As for the spacer group Sp in formula I all groups can be used that are known for this purpose to the skilled in the art. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)-, —CH(CN)—, —CH=CH— or —C≡C—.

Typical spacer groups are for example —$(CH_2)_o$—, —$(CH_2CH_2O)_p$—$CH_2CH_2$—, —$CH_2CH_2$—S—$CH_2CH_2$— or —$CH_2CH_2$—NH—$CH_2CH_2$—, with o being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

Preferred are inventive compounds of formula I wherein Sp is denoting an alkyl or alkoxy group with 2 to 8 C atoms. Straight-chain alkyl or alkoxy groups are especially preferred.

In another preferred embodiment of the invention the chiral compounds of formula I comprise at least one spacer group Sp that is a chiral group of the formula IV:

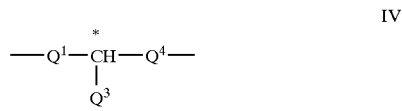

IV wherein $Q^1$ and $Q^3$ have the meanings given in formula III, and $Q^4$ is an alkylene or alkylene-oxy group with 1 to 10 C atoms or a single bond, being different from $Q^1$.

In case $Q^1$ in formula III is an alkylene-oxy group, the O atom is preferably adjacent to the chiral C atom.

In the event that R is denoting P-Sp-X—, the two spacer groups Sp in the compounds of formula I may be identical or different.

Of the preferred compounds described above particularly preferred are those wherein n is 1.

Further preferred are compounds comprising both a group P-(Sp-X)$_n$— wherein n is 0 and a group P-(Sp-X)$_n$— wherein n is 1.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

Examples of suitable polymerizable mesogenic compounds that can be used as components of the polymerizable CLC material, are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention. Preferably the polymerizable CLC mixture comprises at least one polymerizable mesogenic compound having one polymerizable functional group and at least one polymerizable mesogenic compound having two or more polymerizable functional groups.

Examples of useful monoreactive chiral and achiral polymerizable mesogenic compounds are shown in the following list of compounds, which should, however, be taken only as illustrative and is in no way intended to restrict, but instead to explain the present invention:

(Va)

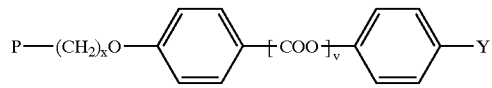

(Vb)

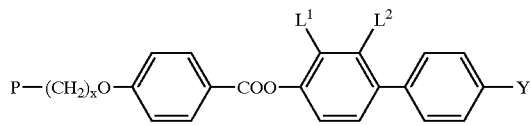

(Vc)

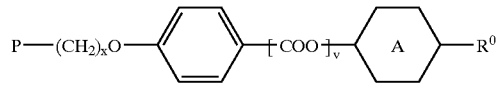

(Vd)

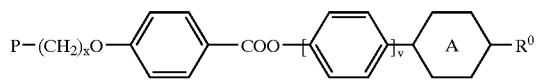

(Ve)

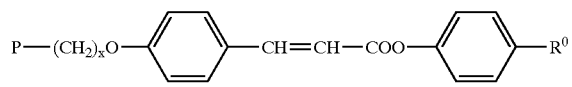

(Vf)

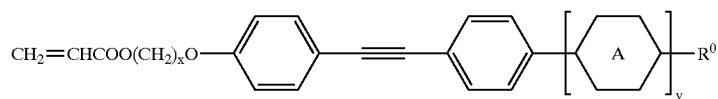

(Vg)

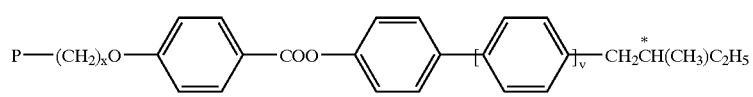

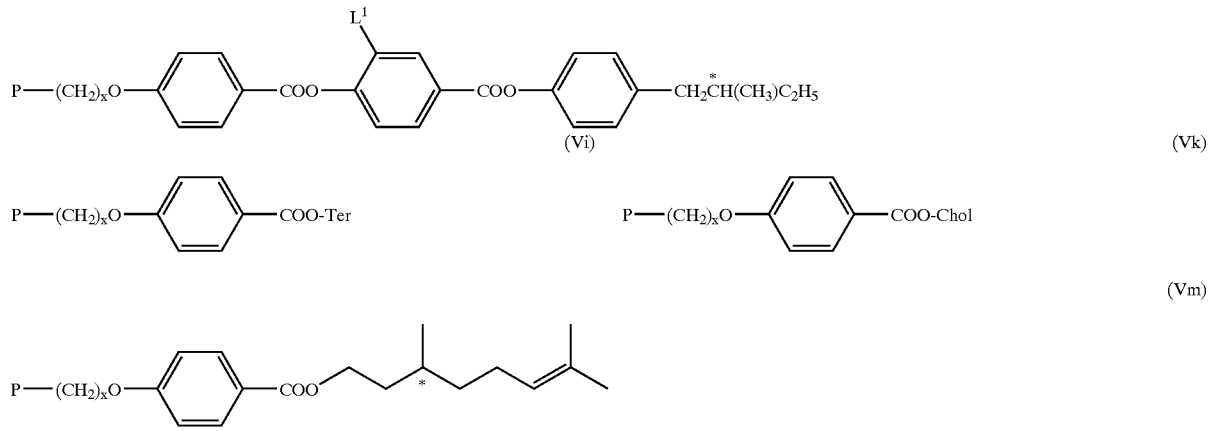

Examples of useful direactive chiral and achiral polymerizable mesogenic compounds are shown in the following list of compounds, which should, however, be taken only as illustrative and is in no way intended to restrict, but instead to explain the present invention In the above formulae, P has one of the meanings of formula I and its preferred meanings as mentioned above, x and y are identical or different integers from 1 to 12, A is 1,4-phenylene that is unsubstituted or substituted in 2-, 3- and/or 5-position by $L^1$ or denotes 1,4-cyclohexylene, $Z^1$

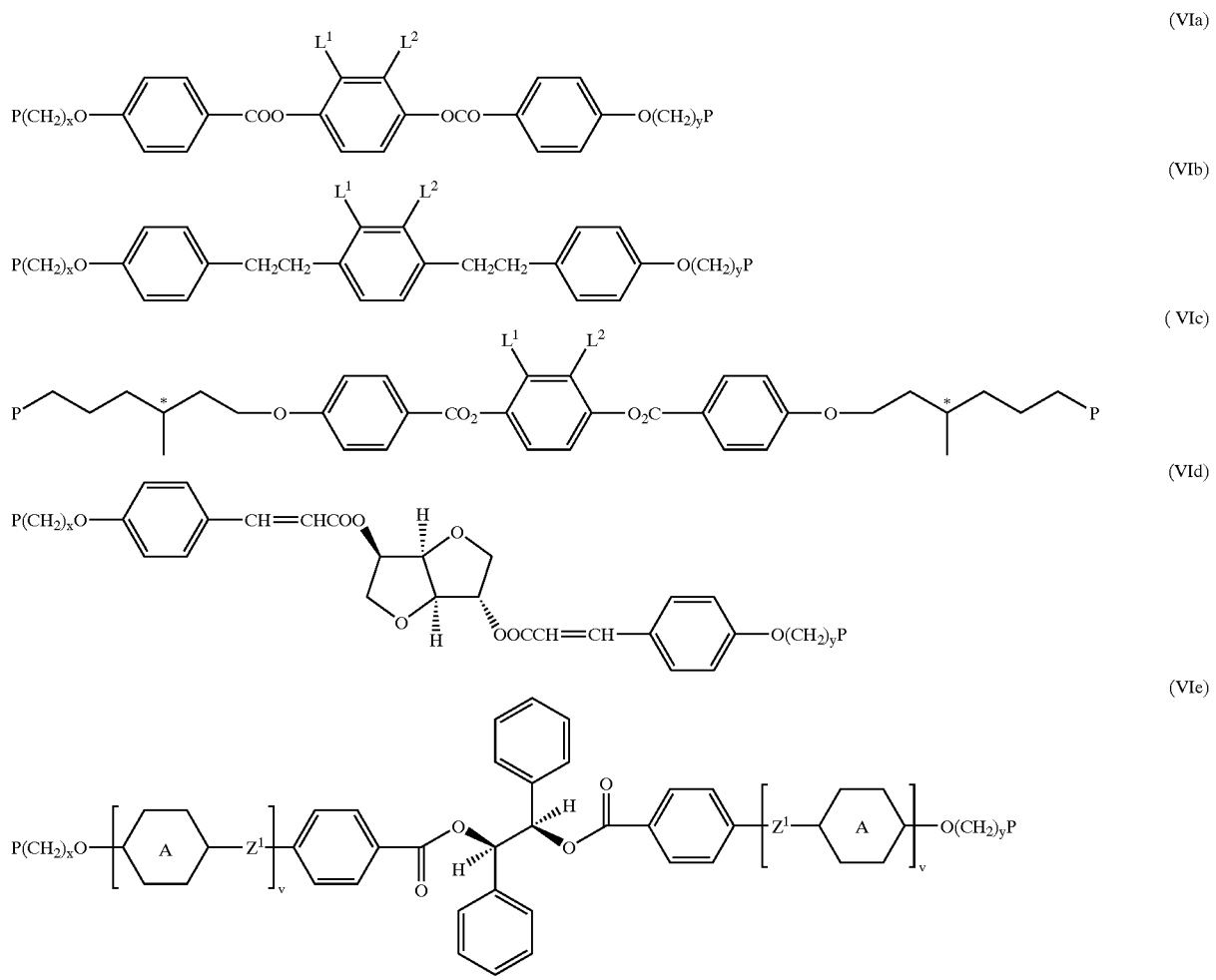

has one of the meanings of formula II, v is 0 or 1, Y is a polar group as defined above, $R^0$ is an unpolar alkyl or alkoxy group, Ter is a terpenoid radical (e.g. menthyl), Chol is a cholesteryl group, $L^1$ and $L^2$ are each independently H, F, Cl, CN, OH, $NO_2$ or an optionally halogenated alkyl, alkoxy or carbonyl group with 1 to 4 C atoms, and the 1,4-phenylene rings in the above formulae may also be substituted in 2-, 3- and/or 5-position by $L^1$.

The term unpolar group in this connection preferably denotes an alkyl group with 1 or more, preferably 1 to 15 C atoms or an alkoxy group with 2 or more, preferably 2 to 15 C atoms.

A polymerizable CLC material according to another preferred embodiment comprises one or more chiral dopants instead of or in addition to chiral polymerizable mesogenic compounds. The chiral dopants themselves do not necessarily have to show a liquid crystalline phase.

Preferred are chiral dopants with a high helical twisting power (HTP), in particular those disclosed in WO 98/00428. Further typically used chiral dopants are e.g. the commercially available S 1011, R 811 or CB 15 (from Merck KGaA, Darmstadt, Germany).

Preferred are chiral non-polymerizable dopants selected from the following formulae

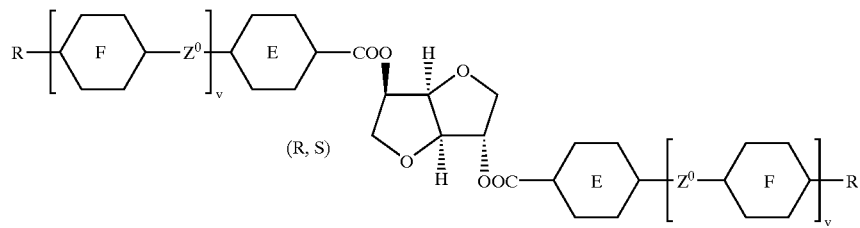

VII

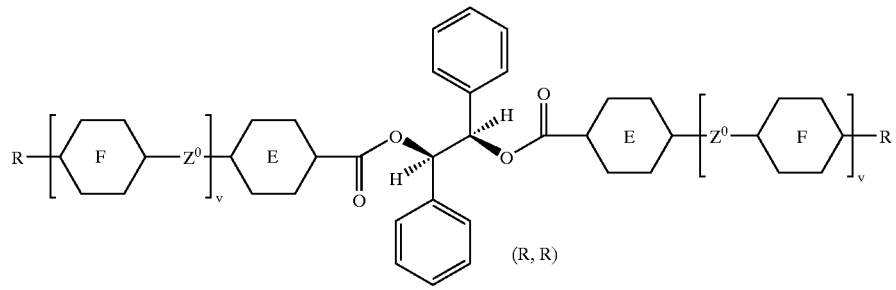

VIII including the (R,S), (S,R), (R,R) and (S,S) enantiomers not shown,
wherein E and F have each independently one of the meanings of A given above, v is 0 or 1, $Z^0$ is —COO—, —OCO—, —$CH_2CH_2$— or a single bond, and R is alkyl, alkoxy, carbonyl or carbonyloxy with 1 to 12 C atoms.

The compounds of formula VII and their synthesis are described in WO 98/00428. The compounds of formula VIII and their synthesis are described in GB 2,328,207.

The above chiral compounds of formula VII and VIII exhibit a very high helical twisting power (HTP), and are therefore particularly useful for the purpose of the present invention.

Preferably the polymerizable CLC material comprises one or more chiral mesogenic compounds that spontaneously exhibit planar alignment when coated onto a substrate, in particular polymerizable chiral compounds of this type. Preferably these compounds are selected of formula I, wherein Sp and/or R are comprising a chiral moiety. Particularly preferred are chiral compounds selected of the formula Va to Vm above.

Polymerization of the polymerizable CLC material can be achieved by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser (e.g. a UV laser, an IR laser or a visible laser).

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used; when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable CLC mixture preferably comprises 0.01 to 10%, very preferably 0.05 to 5%, in particular 0.1 to 3% of a polymerization initiator. UV photoinitiators are preferred, in particular radicalic UV photoinitiators.

The curing time is dependent, inter alia, on the reactivity of the polymerizable mesogenic material, the diameter of the beads, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable material may also comprise one or more other suitable components such as, for example, catalysts, stabilizers, chain-transfer agents, co-reacting monomers or surface-active compounds. Suitable surfactants are described for example in J. Cognard, Mol. Cryst. Liq. Cryst. 78, Supplement 1, 1–77 (1981). In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

It is also possible, in order to increase crosslinking of the polymers, to add up to 20% of a non mesogenic compound with two or more polymerizable functional groups to the polymerizable material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylolpropanetrimethacrylate or pentaerythritoltetraacrylate.

In another preferred embodiment the polymerizable CLC mixture comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the CLC material.

The selection of suitable polymerization temperatures depends mainly on the clearing point of the polymerizable material. Preferably the polymerization temperature is at least 30 degrees below the clearing temperature of the polymerizable mesogenic mixture.

For the use in inks and paints, the polymer beads can be dispersed in a transparent binder or fluid, or incorporated into plastics, depending on the application.

The inks and paints in addition to the inventive pigments may also comprise one or more binders, additional pigments or dyes, curing agents, dispersing agents, fillers and further conventional additives, all of which are known from the state of the art.

For example, in addition to the inventive polymer beads, the inks, paints and lacquers may also comprise one or more dyes or pigments. These dyes or pigments can be selected from conventional inorganic pigments, such as titanium dioxide, iron (III) oxide, iron oxide yellow, chromium oxide, iron blue, carbon black, or organic dyes or pigments like azo, metal complex and polycyclic dyes or pigments based e.g. on phthalocyanine, perylene, pyrrolopyrrol, polymethine or triphenylmethane. Furthermore, additional pigments can be selected from platetet shaped effect pigments like liquid crystal pigments, metal pigments e.g. of copper or aluminium, pearl luster or interference pigments of coated mica, aluminium or carbon black, metal oxide pigments or coated glass flakes.

Suitable binder systems are e.g. polyesters, alkyd resins, polyurethanes, (meth)acrylate copolymers and resins based on cellulose esters, which may also be dissolved or dispersed in an organic solvent. Alternatively, water soluble binders may also be used, e.g. water soluble polymer selected from polyesters, poly(meth)acrylates and polyurethanes.

The coating comprising the inventive pigments and the transparent binder may also be covered by a second coating as clearcoating. Suitable methods and components are disclosed in WO 97/27252.

The inventive polymer beads can be used as effect pigments in spraying or printing inks or paints or colored plastics for decorative applications or cosmetic products. Other important fields of application are the automotive use, active or passive optical elements, e.g. optical films such as polarizers or compensators, and security applications, for example in false-proof security labels, markings or patterns for documents of value, such as ID cards, credit cards, tickets etc.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European application no. 00120111.0-2307, filed Sep. 19, 2000 is hereby incorporated by reference.

EXAMPLES

In the foregoing and in the following examples, unless otherwise indicated, all temperatures are set forth uncorrected in degrees Celsius and all parts and percentages are by weight.

The following abbreviations are used to illustrate the liquid crystalline phase behavior of the compounds: K=crystalline; N=nematic; S=smectic; Ch=cholesteric; I=isotropic. The numbers between the symbols indicate the phase transition temperatures in ° C.

Example 1

Preparation of Polymer Beads

The following reactive mixture was prepared

Compound (1) 90.7%
Compound (2) 2.4%
Compound (3) 2.1%
Irgacure 184 4.8%

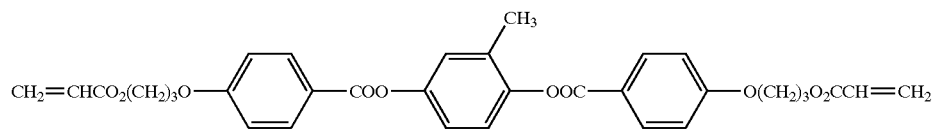

(1)

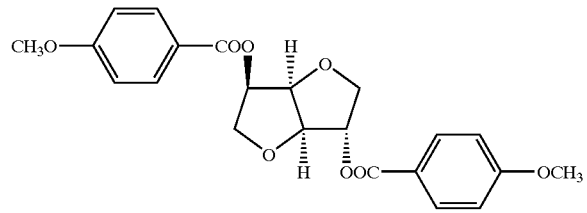

(2)

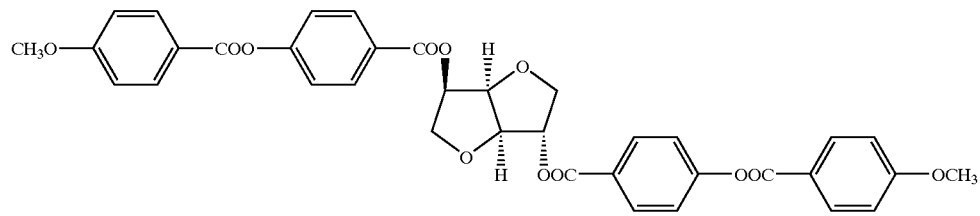

(3)

Compound (1) can be prepared in analogy to the methods described in WO 93/22397. Compounds (2) and (3) are described in WO 98/00428. Irgacure 184® is a photoinitiator commercially available from Ciba AG (Basel, Switzerland).

The mixture reflects right handed circular polarized light. A thin film of the reactive mixture exhibited a green reflection color against a black background.

5 g gum arabicum was dissolved in 50 ml water at approximately 60° C. The solution was added to the above described reactive mixture and the temperature adjusted to 70° C. The resulting mixture was stirred at 70° C. for 4 minutes. The particle size distribution, measured using a microscope and graticule, was 5–10 µm with a considerable quantity of finer material, i.e. less than 2 µm.

The slurry was transferred to a dish and the material polymerized using UV irradiation of a medium pressure Hg discharge lamp for 5 minutes.

The slurry was then washed into a 250 ml measuring cylinder and allowed to stand for 64 hours. The liquid, containing the fines, was decanted. The residue was triturated with a further 200 ml water and allowed to stand for 48 hours. The supernatant liquid was again decanted. The residue was triturated with 100 ml water and the slurry filtered. The filter cake, consisting of solid spheres, gave a purple coating when suspended in a polyacrylate binder.

Example 2

Preparation of a Reflective Film 2 g of dried polymer beads from example 1 were stirred with 3 g of commercially available acrylic emulsion Glascol LE-15® (from Ciba Geigy) and 1 ml of water for 16 hours to give a dispersion of beads in the resin. About 1 ml of this dispersion was applied to the surface of a black card and spread using a wire wound bar to give a 12 µm thick wet film which was dried in a warm oven to give a uniform coating that appeared purple. Under a right handed circular polarizer the film became almost extinct, but was unaffected in appearance when viewed through a left handed circular polarizer.

What is claimed is:

1. A reflective film comprising one or more polymer beads, wherein said beads comprise an anisotropic polymer material with helically twisted structure.

2. A transmissive binder comprising a reflective film according to claim 1.

3. A reflective film according to claim 1, comprising at least two different polymer beads.

4. A reflective film according to claim 3, wherein the at least two different polymer beads reflect circularly polarized light of different handedness.

5. A security marking or a security device, a spraying or printing ink, a pigment, a cosmetic product, an active or passive optical element, or a plastic material comprising one or more polymer beads, wherein said beads comprise an anisotropic polymer material with helically twisted structure.

* * * * *